(12) United States Patent
Steinberger et al.

(10) Patent No.: US 7,957,412 B2
(45) Date of Patent: Jun. 7, 2011

(54) LONELY PULSE COMPENSATION

(75) Inventors: Michael Steinberger, Chippewa Falls, WI (US); Ricky J. Hakes, Oregon, WI (US); Christopher K. White, Rochester, MN (US)

(73) Assignee: Cray Inc., Seattle, WA (US)

( * ) Notice: Subject to any disclaimer, the term of this patent is extended or adjusted under 35 U.S.C. 154(b) by 702 days.

(21) Appl. No.: 12/051,674

(22) Filed: Mar. 19, 2008

(65) Prior Publication Data

US 2009/0238257 A1  Sep. 24, 2009

(51) Int. Cl.
 *H04L 12/66* (2006.01)
(52) U.S. Cl. ......................................... 370/463; 455/266
(58) Field of Classification Search .................. 375/220, 375/257, 233; 455/296, 266; 330/304, 302
See application file for complete search history.

(56) References Cited

U.S. PATENT DOCUMENTS

| | | | |
|---|---|---|---|
| 5,142,508 A * | 8/1992 | Mitchell et al. ............... | 367/141 |
| 5,157,277 A * | 10/1992 | Tran et al. ..................... | 327/156 |
| 5,495,403 A * | 2/1996 | Dhyanchand et al. .......... | 363/43 |
| 6,269,118 B1 * | 7/2001 | Hanna et al. ................... | 375/233 |
| 6,580,327 B1 * | 6/2003 | Joffe et al. ..................... | 330/304 |
| 6,717,995 B2 * | 4/2004 | Zvonar .......................... | 375/340 |
| 6,895,040 B2 * | 5/2005 | Zhou ............................. | 375/220 |
| 6,944,213 B2 * | 9/2005 | Lee ................................ | 375/220 |
| 7,042,518 B1 * | 5/2006 | Morrish ........................ | 348/625 |
| 7,372,335 B2 * | 5/2008 | Komijani et al. .............. | 330/302 |
| 7,436,216 B1 * | 10/2008 | Brunn et al. .................... | 326/83 |
| 7,711,341 B2 * | 5/2010 | Haub ............................. | 455/296 |
| 2007/0281653 A1 * | 12/2007 | Haub ............................. | 455/266 |
| 2008/0031474 A1 * | 2/2008 | Berardi et al. .................. | 381/99 |
| 2008/0063091 A1 * | 3/2008 | Dong et al. .................... | 375/257 |

* cited by examiner

*Primary Examiner* — Thong H Vu
(74) *Attorney, Agent, or Firm* — Schwegman, Lundberg & Woessner, P.A.

(57) ABSTRACT

An apparatus comprising a transmission line, a receiver circuit, and a high pass filter circuit coupled between the transmission line and a receiver circuit input. The receiver circuit is configured to receive a data signal over the transmission line at a first data rate. The high pass filter circuit is connected between the transmission line and a receiver circuit input and has a corner frequency that is less than approximately the first data rate and is greater or equal to than approximately one-half the second data rate. The second data rate is an effective data rate caused by an expected data pattern on the transmission line. Other devices, systems, and methods are disclosed.

23 Claims, 6 Drawing Sheets

LONELY PULSE COMPENSATION

FEDERALLY SPONSORED RESEARCH OR DEVELOPMENT

The U.S. Government has a paid-up license in this invention and the right in limited circumstances to require the patent owner to license others on reasonable terms as provided for by the terms of Contact No. MDA904-02-3-0052, awarded by the Maryland Procurement Office.

BACKGROUND

Computers sometimes communicate electrical data signals over long and short distances using transmission lines. A transmission line is a communications medium that forms the path between connections within a computer system or between computer systems to convey data signals. Examples include a coaxial transmission line and a stripline transmission line.

The data signals transition between high and low voltage levels. Comparators are typically used to detect transmitted 1's and 0's by determining whether a voltage level of the data signal is either high or low for a single ended transmission line, or positive or negative for a differential transmission line. Due to losses, a data signal level declines as the data signal propagates across the transmission line. For this reason, transmission line receivers often include an equalizer circuit to provide gain to equalize the loss in the data signal. However, an equalizer circuit is often insufficient to correct other problems that are encountered when transmitting data signals over transmission lines. The present inventors have recognized a need for improvement in transmitting data signals over transmission lines.

Overview

This document discusses, among other things, apparatuses, systems, and methods for compensating a communications medium such as a transmission line. An apparatus example includes a transmission line, a receiver circuit, and a high pass filter circuit coupled between the transmission line and a receiver circuit input. The receiver circuit is configured to receive a data signal over the transmission line at a first data rate. The high pass filter circuit is connected between the transmission line and a receiver circuit input and has a corner frequency that is less than approximately the first data rate and is greater than or equal to approximately one-half the second data rate. The second data rate is an effective data rate caused by an expected data pattern on the transmission line.

A system example includes a Serializer/Deserializer (SerDes) transmitter circuit, a transmission line in electrical communication with the SerDes transmitter circuit, a SerDes receiver circuit in electrical communication with the transmission line, and a high pass filter circuit, coupled between the transmission line and a SerDes receiver circuit input. The SerDes receiver circuit is configured to receive a data signal over the transmission line at a first data rate. The high pass filter circuit has a corner frequency that is less than approximately the first data rate and is greater than or equal to approximately one-half a second data rate. The second data rate is an effective data rate caused by an expected data pattern on the transmission line.

A method example includes providing a receiver, determining a first data rate associated with a transmission line, determining a second data rate associated with an expected data pattern on the transmission line, and connecting a high-pass filter circuit between the receiver and the transmission line. The high-pass filter circuit has a corner frequency between approximately the first data rate and approximately one-half the second data rate.

This overview is intended to provide an overview of the subject matter of the present patent application. It is not intended to provide an exclusive or exhaustive explanation of the invention. The detailed description is included to provide further information about the subject matter of the present patent application.

DETAILED DESCRIPTION

In the following detailed description, reference is made to the accompanying drawings which form a part hereof, and specific embodiments in which the invention may be practiced are shown by way of illustration. It is to be understood that other embodiments may be used and structural or logical changes may be made without departing from the scope of the present invention.

One problem that may occur when transmitting data signals at high speed over a transmission line is the "lonely pulse" phenomenon. The lonely pulse phenomenon occurs where a long string of a monotonic data pattern (e.g., either all 1's or 0's) received over the transmission line is followed by either a single pulse or a sequence of rapidly alternating data (e.g., a high edge rate). Such a string of data causes the baseline voltage of the received data signal to wander or drift away from a decision threshold used to determine whether the received data is a 1 or a 0. This can negatively affect the performance of the data channel if the decision threshold cannot track the baseline voltage drift.

Figure 1:
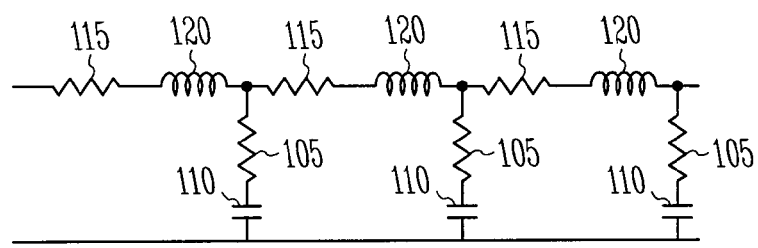
FIG. 1 shows a schematic of a circuit model approximation of a transmission line.

FIG. 1 shows a schematic of a circuit model approximation of a transmission line. The series resistance 115 of the circuit model represents transmission line losses, primarily in the center conductor of the transmission line. The shunt resistance 105 in the model is shown as being in series with the shunt capacitance 110, rather than the more typical arrangement of in parallel with the shunt capacitance 110, is due to dielectric losses. The lonely pulse phenomenon occurs at a lower frequency or range of frequencies for which the series resistance 115 dominates the series inductance 120. This frequency or range is determined by the geometry of the path that comprises the transmission line and the skin depth of the transmission line material.

Figure 2:
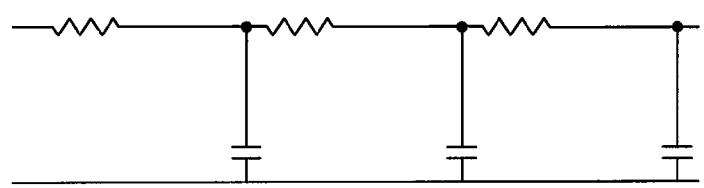
FIG. 2 shows a schematic of a circuit model approximation of a transmission line at lower frequencies.

FIG. 2 shows, a circuit model that approximates a transmission line at these lower frequencies. Because the effect of the shunt resistance is lessened, the circuit model reduces to a series of RC pairs which is manifested as charge accumulating on the transmission line. This RC charging phenomenon results in wander of the baseline voltage of data signals. As the baseline voltage wanders or drifts, the baseline level of a data signal may shift away from a trip point of a comparator used to detect the transmitted 1's and 0's resulting in errors in data transmission.

Figure 3:
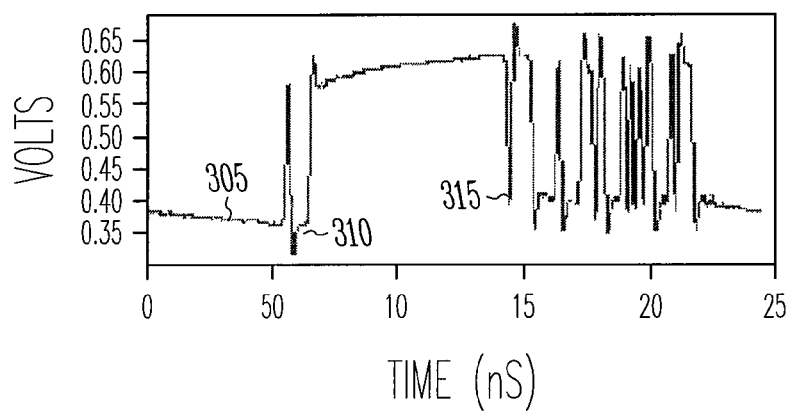
FIG. 3 shows an example of the lonely pulse phenomenon.

FIG. 3 shows an example of the lonely pulse phenomenon. The RC charging phenomenon can be observed between 6 ns and 14 ns. The data signal 305 has a different baseline voltage at 6 ns 310 than the baseline voltage at 14 ns 315. This amount of wander in the baseline voltage, even over the small number of data bits shown in FIG. 3, is enough to increase bit error rate by several orders of magnitude.

Equalizers typically correct for signal transmission losses but do not correct for the charging resulting from the long monotonic data patterns. One approach is to require a minimum number of transitions (1 to 0, or 0 to 1) in a transmitted data signal. However, this adds overhead to the communication protocol and reduces data bandwidth of the communication link or connection.

Figure 4:
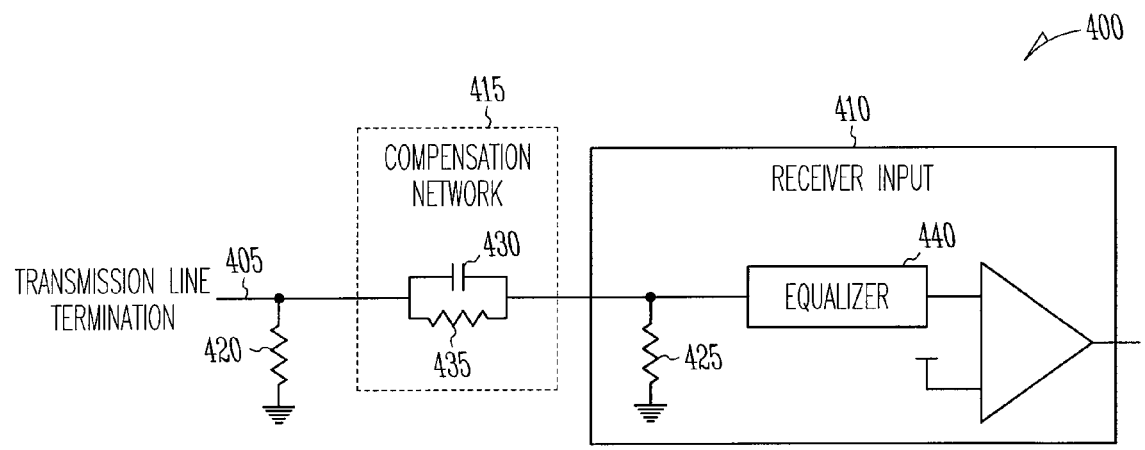
FIG. 4 is a schematic of an embodiment of a device to compensate for the lonely pulse phenomenon.

FIG. 4 is a schematic of an embodiment of a device 400 to compensate for the lonely pulse phenomenon. The device 400 includes a transmission line 405 and a receiver circuit 410 to receive a data signal over the transmission line 405 at a first data rate. The device 400 also includes a high-pass filter circuit 415 connected between the transmission line and an input to the receiver circuit 410. The high pass filter circuit 415 has a corner frequency that is less than approximately the first data rate but greater than or equal to approximately one-half a second data rate. The second data rate is an effective data rate caused by an expected data pattern on the transmission line.

The transmission line 405 has a propagation constant $\gamma$. The propagation constant $\gamma$ is typically expressed as $\gamma = \alpha + j\beta$, where $\alpha$ is the attenuation constant and $\beta$ is the phase constant. The transmission line 405 shown represents a single-ended transmission line.

In some embodiments, the receiver circuit 410 includes a comparison circuit and the receiver circuit 410 detects data in the data signal by comparison to a voltage threshold. The received data signal has a baseline voltage. The propagation constant of the transmission line 405 is frequency dependent and causes the baseline voltage to drift away from the voltage threshold when receiving a data signal at the second data rate.

The second data rate is an effective data rate caused by a monotonic pattern of data received at the first data rate. For example, if the first data rate is 1 gigabit per second (1 Gb/s) and the data signal contains ten bits of 1's followed by ten bits of 0's, the second data rate is 1 Gb/(10+10), or 50 megabits per second (50 Mb/s). In other words, when data is received at the first data rate, the baseline voltage of the data signal does not drift and the receiver circuit 410 is able to receive the data. When a monotonic data pattern is received containing a string with a sufficient number of all 1's or all 0's, receiving the monotonic data causes the lonely pulse phenomenon and the baseline voltage drifts.

The high pass filter circuit 415 compensates for the charging of the transmission line that causes the lonely pulse phenomenon. Because the filter is high pass, the high pass filter circuit 415 passes signals having the first data rate and attenuates signals having the lower second data rate. This allows longer run patterns to be received without the addition of tracking circuitry or without requiring a minimum number of transitions in the received signal.

In some examples, the first data rate is greater than or equal to approximately 1 Gb/s and the second data rate is less than approximately six hundred megabits per second (600 Mb/s). In some examples, the corner frequency of the high pass filter circuit 415 is set at about 300 megahertz (300 MHz). In some examples, the second data rate is an effective data rate resulting when ten or more monotonic bits of data are received at the receiver circuit 410. In some embodiments, the device 400 includes a termination circuit, such as a termination resistor 420. Resistor 425 represents the input resistance seen at the input of the receiver circuit 410.

Typically, the receiver input is a base or gate of a transistor. In some embodiments, the high pass filter circuit 415 includes a capacitor 430 coupled between the termination circuit and the receiver circuit input and a resistor 435 coupled parallel to the capacitor 430. Thus, the high pass filter circuit 415 is a passive circuit that can fit within the same integrated circuit (IC) as the receiver circuit 410.

In some embodiments, the receiver circuit 410 includes an equalizer circuit 440 to counteract transmission line loss at frequencies near one-half the first data rate. In some embodiments, the high pass filter circuit 415 is placed between the transmission line 405 and the equalizer circuit 440. In certain embodiments, the high pass filter circuit 415 attenuates the received electrical signal having the second data rate, and the equalizer circuit 440 is configured to provide gain to a received electrical signal of the first data rate.

Figure 5:
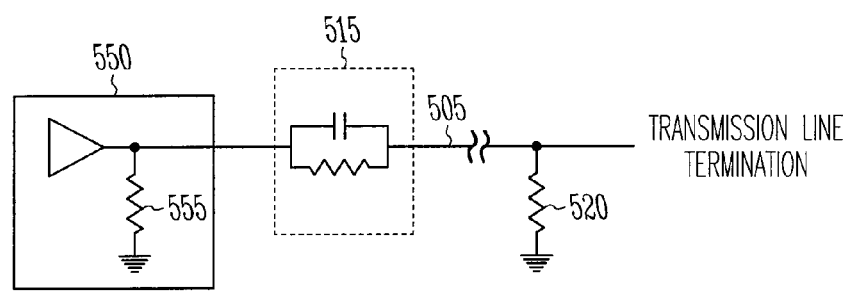
FIG. 5 is a schematic of another embodiment of a device to compensate for the lonely pulse phenomenon.

FIG. 5 is a schematic of another embodiment of a device 500 to compensate for the lonely pulse phenomenon. The high-pass filter circuit 515 is connected between the transmission line 505 and an output of a transmitter circuit 550 on the transmitting side of the transmission line 505. However, this arrangement is complicated by the fact that the output impedance 555 of the transmitter circuit 550 is much lower than the impedance after the termination resistor 520 at the receiver.

There may be a range of data rates that cause the lonely pulse phenomenon. In some embodiments, the second data rate is a value representative of the range of values. The second data rate value may be chosen according to a fixed pattern that causes the lonely pulse phenomenon, and adjusting the second data rate to accommodate some amount of random data that deviates from the fixed pattern. In some embodiments, the second data rate is determined from a central tendency calculated from the range of second data rates. In certain embodiments, the central tendency is an average of all second data rates in the range. The second data rate value is then chosen as a minimum second data rate defined by the length of the data message.

Figure 6A:
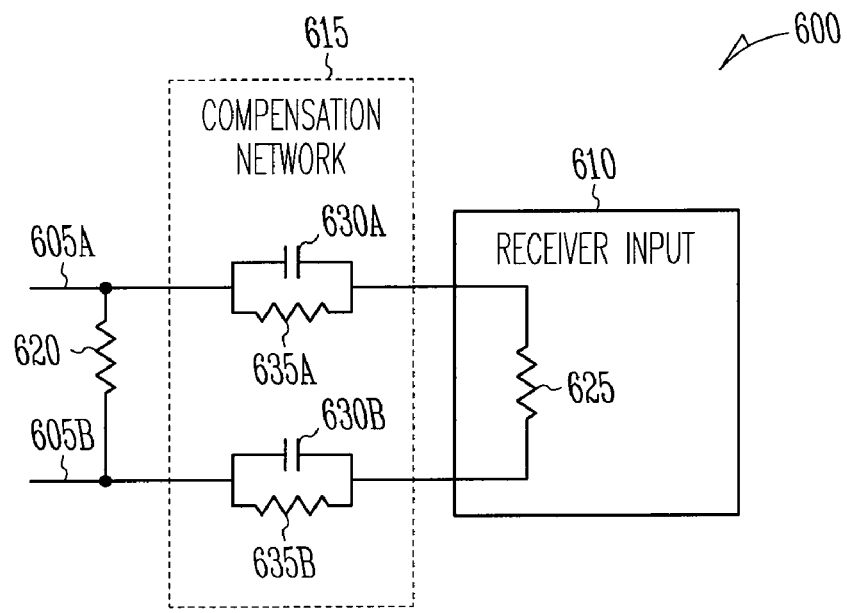
FIG. 6A is a schematic of an embodiment of a device to compensate for the lonely pulse phenomenon that includes a differential transmission line.

FIG. 6A is a schematic of an embodiment of a device 600 to compensate for the lonely pulse phenomenon that includes a differential transmission line. The differential transmission line includes a positive conductor 605A and a negative conductor 605B. In certain embodiments, the device 600 includes a termination circuit, such as termination resistor 620 for example. The receiver circuit 610 is a differential receiver having a positive input and a negative input. Resistor 625 represents the resistance seen at the input of receiver circuit 610. In certain embodiments, the device 600 includes a high pass filter circuit 615 between the termination circuit 620 and the receiver circuit 610. In certain embodiments, the high pass filter circuit 615 includes a first capacitor 630A coupled between the termination circuit and the positive receiver circuit input, a first resistor 635A coupled parallel to the first capacitor 630A, a second capacitor 630B coupled between the termination circuit and the negative receiver circuit input, and a second resistor 635B coupled parallel to the second capacitor 630B. The RC network provides little or no attenuation at high frequencies. The high-pass filter circuit 615 may also be connected between the transmission line 605A, 605B and an output of a transmitter circuit on the transmitting side of the transmission line 605A, 605B.

Figure 6B:
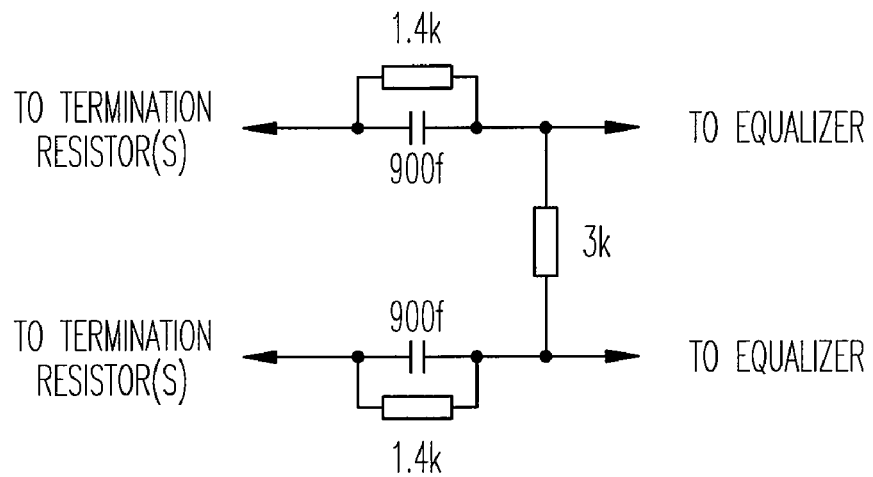
FIG. 6B is a partial schematic of the device in FIG. 6A with example component values.

FIG. 6B is a partial schematic of the device in FIG. 6A with example component values. The device is placed between resistor(s) terminating the transmission line and an equalizer circuit. Resistors 635A, 635B are selected to be 1.4 kilo-ohms (1.4 kΩ) and the capacitors 630A, 630B are selected to be 900 femtofarads (ff). The 3 kΩ resistor represents the input impedance of the receiver circuit.

Figure 7:
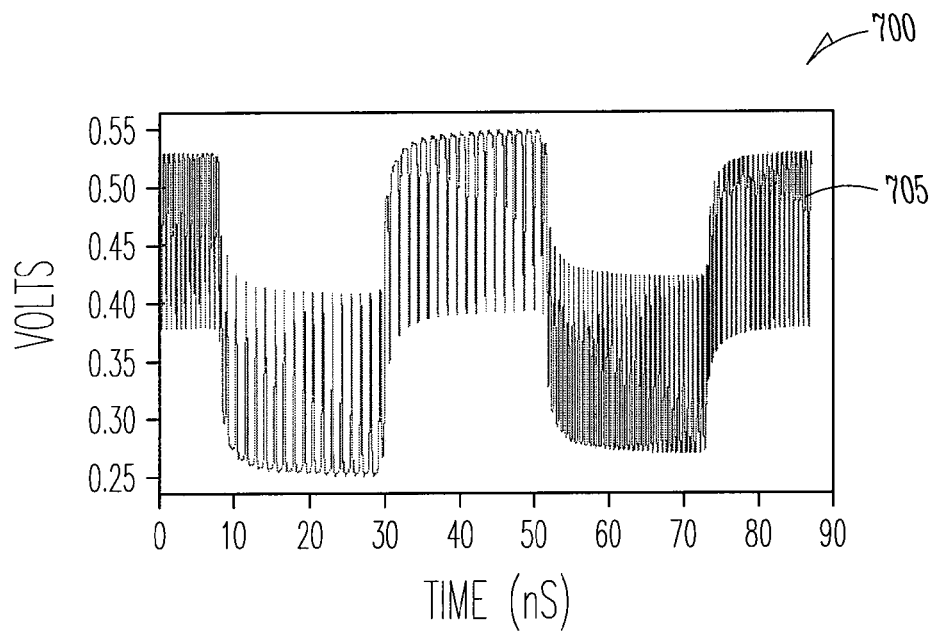
FIG. 7 is a graph showing a simulation of the lonely pulse phenomenon on a differential transmission line without compensation for the phenomenon.

FIG. 7 is a graph 700 showing a simulation of the lonely pulse phenomenon on a differential transmission line without compensation for the phenomenon. The low frequency wander that is characteristic of the lonely pulse phenomenon is apparent as the exponentially decaying rise or fall in the envelope of the signal 705.

Figure 8:
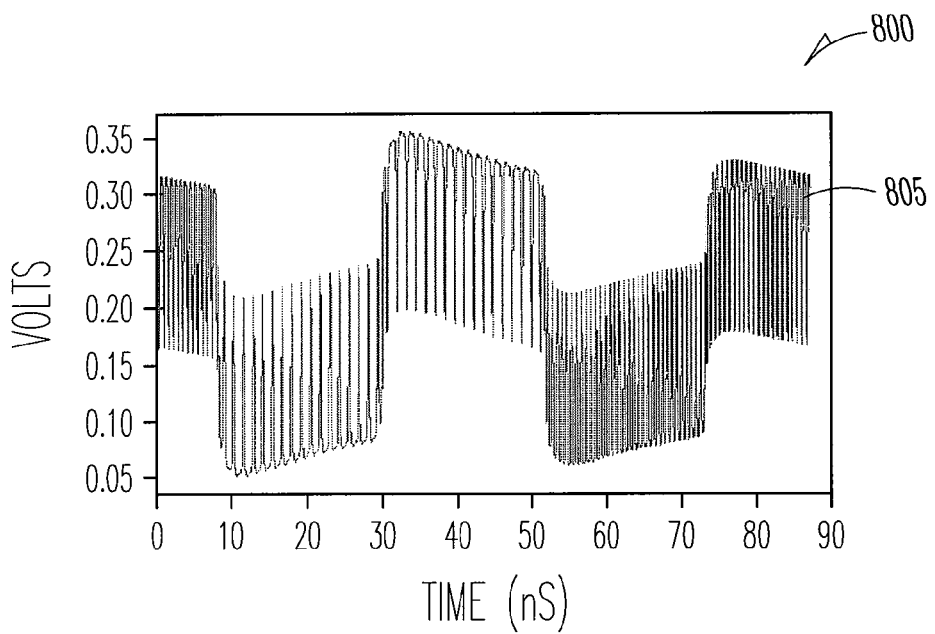
FIG. 8 is a graph showing an example simulation of the lonely pulse phenomenon on a differential transmission line using compensation for the phenomenon.

FIG. 8 is a graph 800 showing an example simulation of the lonely pulse phenomenon on a differential transmission line using compensation for the phenomenon. The transmission line compensation is the circuit shown in FIG. 6 with the resistors 635A, 635B selected to be 100Ω and the capacitors 630A, 630B selected to be 330 picofarads (pf). It can be seen that the compensation counteracts the low frequency baseline voltage wander in the reduction in the envelope of the signal 805.

Figure 9:
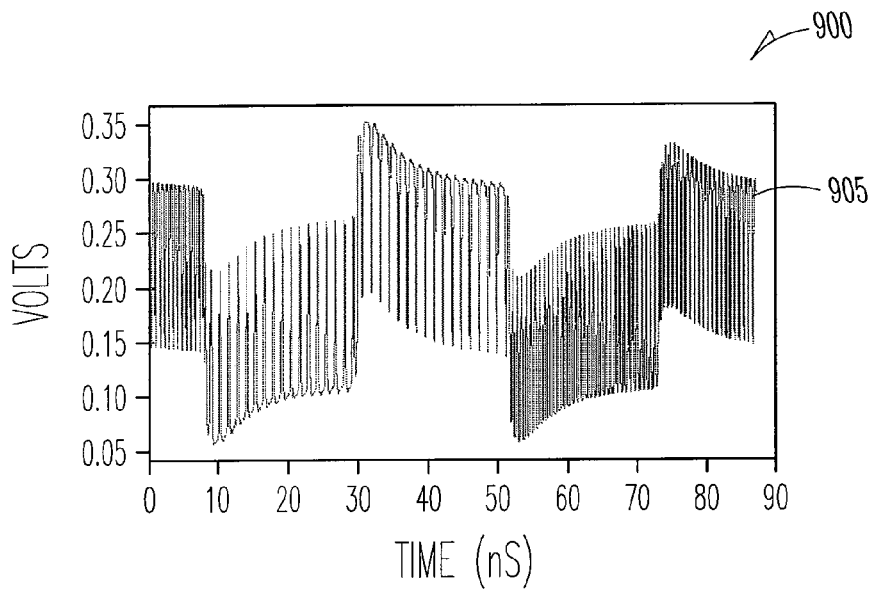
FIG. 9 is a graph showing another example simulation of the lonely pulse phenomenon on a differential transmission line using compensation for the phenomenon.

FIG. 9 is a graph 900 showing an example simulation of the lonely pulse phenomenon on a differential transmission line using different compensation. The transmission line compensation is the circuit shown in FIG. 6 with the resistors 635A, 635B selected to be 100Ω and the capacitors 630A, 630B selected to be 100 pf.

Figure 10:
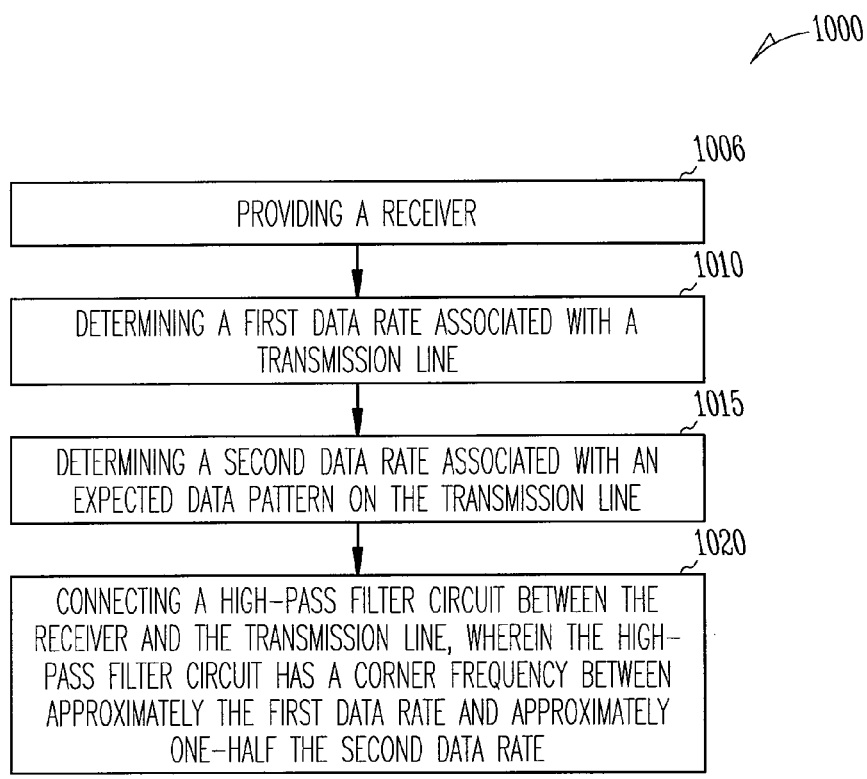
FIG. 10 is a flow diagram of a method of compensating a transmission line for the lonely pulse phenomenon.

FIG. 10 is a flow diagram of a method 1000 of compensating a transmission line for the lonely pulse phenomenon. At block 1005, a receiver is provided. At block 1010, a first data rate associated with the transmission line is determined. At block 1015, a second date rate associated with an expected data pattern on the transmission line is determined. In some embodiments, determining the second data rate includes determining the second data rate from an expected pattern of data received at the first data rate. In certain embodiments, determining the second data rate includes determining an effective data rate resulting when bits of monotonic data (e.g., ten or more) are received at the first data rate.

At block 1020, a high-pass filter circuit is connected between the receiver and the transmission line. The high-pass filter circuit has a corner frequency between approximately the first data rate and approximately one-half the second data rate. In some embodiments, providing a receiver includes providing an equalizer to compensate for transmission line loss in signals of frequencies near one-half the first data rate, and connecting a high-pass filter circuit includes connecting a high-pass filter circuit between a transmission line termination circuit and the equalizer.

Figure 11:
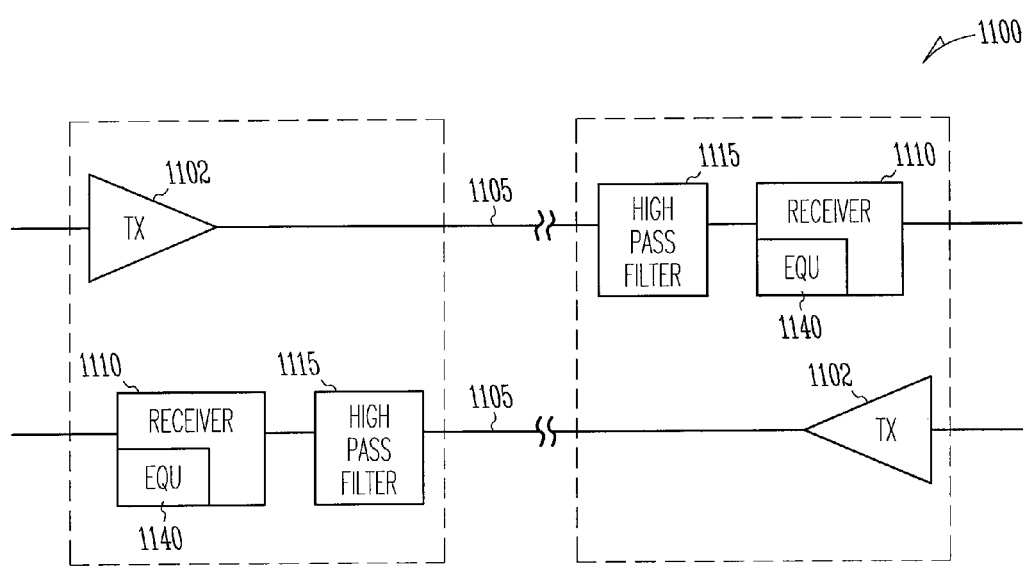
FIG. 11 is a block diagram of an embodiment of a system that includes compensation for the lonely pulse phenomenon.

FIG. 11 is a block diagram of an embodiment of a system 1100 that includes compensation for the lonely pulse phenomenon. The system 1100 includes a Serializer/Deserializer (SerDes) transmitter circuit 1102 and a SerDes receiver circuit 1110. SerDes circuits communicate data over point-to-point connections. This is in contrast to bus connections in which multiple points are attached to a bus and the multiple points share time communicating over the bus. SerDes circuits transmit parallel data over a serial link between two points by converting parallel data into serial data for transmission and converting the received serial data to parallel data. This allows fewer physical interconnections to be necessary between the two points. A single SerDes interconnection may be referred to as a SerDes lane. Several SerDes lanes may comprise a SerDes channel. The block diagram of FIG. 11 shows a single SerDes interconnection and each end of the SerDes connection includes a dedicated SerDes transmit and receive pair.

The SerDes transmitter circuit 1102 and the SerDes receiver circuit 1110 are in electrical communication with a transmission line 1105. In some embodiments, the transmission line 1105 includes a coaxial transmission line. In some embodiments, the transmission line 1105 includes a coplanar waveguide. In some embodiments, the transmission line 1105 includes a stripline transmission line. A stripline transmission line refers to a flat strip of metal as the conductor which is sandwiched between two parallel ground planes. An insulating substrate between the metal and the ground planes forms a dielectric. In some embodiments, the transmission line 1105 includes a microstrip transmission line. A microstrip transmission line refers to a thin flat conductor parallel to a ground plane. The microstrip transmission line is typically formed on a printed circuit board.

The SerDes receiver circuit 1110 receives a data signal over the transmission line 1105 at a first data rate. The system 1100 also includes a high pass filter circuit 1115 coupled between the transmission line 1105 and an input to the SerDes receiver circuit 1110. The high pass filter circuit 1115 has a corner frequency that is less than approximately the first data rate and is greater than or equal to approximately one-half the second data rate. The second data rate is an effective data rate caused by an expected data pattern on the transmission line. The data signal has a baseline voltage and the transmission line has a propagation constant γ that causes drift in the baseline voltage when receiving a data signal having the second data rate.

In certain embodiments, the expected data pattern is a monotonic pattern of data received at the first data rate. In certain embodiments, the expected data pattern is a monotonic pattern of ten or more bits of data. In certain embodiments, the SerDes receiver circuit 1110 includes an equalizer circuit to counteract transmission line loss at frequencies near one-half the first data rate. In certain embodiments, the high pass filter circuit 1115 is placed between the transmission line 1105 and the equalizer circuit. In certain embodiments, the high pass filter circuit 1115 is placed at the output of the SerDes transmitter circuit 1102.

In some embodiments, the transmission line 1105 is a single-ended transmission line and includes a termination circuit. The high pass filter circuit 1115 includes a capacitor coupled between the termination circuit and the input to the SerDes receiver circuit 1110, and a resistor coupled parallel to the capacitor. In some embodiments, the transmission line 1105 is a differential transmission line including a positive conductor and a negative conductor. In certain embodiments, the transmission line 1105 includes a termination circuit. The SerDes receiver circuit 1110 is a differential receiver having a positive and a negative input. The high pass filter circuit 1115 includes a first capacitor coupled between the termination circuit and the positive receiver circuit input, a first resistor coupled parallel to the first capacitor, a second capacitor coupled between the termination circuit and the negative receiver circuit input, and a second resistor coupled parallel to the second capacitor.

The compensation circuits described reduce the amount of drift of the baseline voltage that occurs from the RC charging of the transmission line. The compensation circuits can easily be fabricated on the same IC as the receiving electronics.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations, or variations, or combinations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own.

What is claimed is:

1. An apparatus comprising:
   a transmission line;
   a receiver circuit configured to receive a data signal over the transmission line at a first data rate; and
   a high-pass filter circuit, connected between the transmission line and a receiver circuit input, wherein the high pass filter circuit has a corner frequency that is less than approximately the first data rate and is greater than or equal to approximately one-half a second data rate, wherein the second data rate is an effective data rate caused by an expected data pattern on the transmission line.

2. The apparatus of claim 1, wherein the second data rate is an effective data rate caused by a pattern of monotonic bits of data on the transmission line.

3. The apparatus of claim 1, wherein the second data rate is less than about six hundred megabits per second (600 Mb/s), and the first data rate is greater than or equal to about one gigabit per second (1 Gb/s).

4. The apparatus of claim 1, wherein the transmission line includes a termination circuit, and wherein the high pass filter circuit includes:
   a capacitor coupled between the termination circuit and the receiver circuit input; and
   a resistor coupled parallel to the capacitor.

5. The apparatus of claim 1, wherein the transmission line is a differential transmission line including a positive conductor, a negative conductor, and a termination circuit, wherein the receiver circuit is a differential receiver having a positive and a negative input, and wherein the high pass filter circuit includes:
   a first capacitor coupled between the termination circuit and the positive receiver circuit input;
   a first resistor coupled parallel to the first capacitor;
   a second capacitor coupled between the termination circuit and the negative receiver circuit input; and
   a second resistor coupled parallel to the second capacitor.

6. The apparatus of claim 1, wherein the receiver circuit includes an equalizer circuit configured to counteract transmission line loss in signals having frequencies near one-half the first data rate, and wherein the high pass filter circuit is placed between the transmission line and the equalizer circuit.

7. The apparatus of claim 6, wherein the high pass filter circuit is configured to attenuate the received electrical signal having the second data rate and the equalizer is configured to provide gain to a received electrical signal of the first data rate.

8. The apparatus of claim 1, wherein the receiver circuit is configured to detect data in a data signal by comparison to a voltage threshold, wherein the data signal has a baseline voltage, wherein a propagation constant of the transmission line is frequency dependent and causes the baseline voltage to drift away from the voltage threshold when receiving a data signal having the second data rate, and wherein the second data rate is an effective data rate caused by a monotonic pattern of data received at the first data rate.

9. A system comprising:
   a Serializer/Deserializer (SerDes) transmitter circuit;
   a transmission line in electrical communication with the SerDes transmitter circuit;
   a SerDes receiver circuit in electrical communication with the transmission line, wherein the SerDes receiver circuit is configured to receive a data signal over the transmission line at a first data rate; and
   a high pass filter circuit, coupled between the transmission line and a SerDes receiver circuit input, wherein the high pass filter circuit has a corner frequency that is less than approximately the first data rate and is greater than or equal to approximately one-half a second data rate, wherein the second data rate is an effective data rate caused by an expected data pattern on the transmission line.

10. The system of claim 9, wherein the transmission line includes a termination circuit, and wherein the high pass filter circuit includes:
    a capacitor coupled between the termination circuit and the receiver circuit input; and
    a resistor coupled parallel to the capacitor.

11. The system of claim 9, wherein the SerDes receiver circuit includes an equalizer circuit configured to counteract transmission line loss in signals having frequencies near one-half the first data rate, and wherein the high pass filter circuit is placed between the transmission line and the equalizer circuit.

12. The system of claim 9, wherein the transmission line is a differential transmission line including a positive conductor, a negative conductor, and a termination circuit, wherein the receiver is a differential receiver having a positive and a negative input, and wherein the high pass filter circuit includes:
 a first capacitor coupled between the termination circuit and the positive receiver circuit input;
 a first resistor coupled parallel to the first capacitor;
 a second capacitor coupled between the termination circuit and the negative receiver circuit input; and
 a second resistor coupled parallel to the second capacitor.

13. The system of claim 9, wherein the transmission line includes a coaxial transmission line.

14. The system of claim 9, wherein the transmission line includes a stripline transmission line.

15. The system of claim 9, wherein the transmission line includes a coplanar waveguide.

16. The system of claim 9, wherein the transmission line includes a microstrip transmission line.

17. A method comprising:
 providing a receiver;
 determining a first data rate associated with a transmission line;
 determining a second data rate associated with an expected data pattern on the transmission line; and
 connecting a high-pass filter circuit between the receiver and the transmission line, wherein the high-pass filter circuit has a corner frequency between approximately the first data rate and approximately one-half the second data rate.

18. The method of claim 17, wherein determining the second data rate includes determining the second data rate from an expected pattern of data received at the first data rate.

19. The method of claim 17, wherein determining the second data rate includes determining an effective data rate resulting when ten or more bits of monotonic data are received at the first data rate.

20. The method of claim 17, wherein providing a receiver includes providing an equalizer to compensate for transmission line loss in signals having frequencies near one-half the first data rate, and wherein connecting a high pass filter circuit includes connecting a high-pass filter circuit between a transmission line termination circuit and the equalizer.

21. An apparatus comprising:
 a transmission line;
 a transmitter circuit configured to transmit a data signal over the transmission line at a first data rate; and
 a high-pass filter circuit, connected between a transmitter circuit output and the transmission line, wherein the high pass filter circuit has a corner frequency that is less than approximately the first data rate and is greater than or equal to approximately one-half a second data rate, wherein the second data rate is an effective data rate caused by an expected data pattern on the transmission line.

22. The apparatus of claim 21, wherein the transmission line includes a termination circuit, and wherein the high pass filter circuit includes:
 a capacitor coupled between the transmitter circuit output and the transmission line; and
 a resistor coupled parallel to the capacitor.

23. The apparatus of claim 21, wherein the transmission line is a differential transmission line including a positive conductor, a negative conductor, and a termination circuit, wherein the transmitter circuit is a differential transmitter having a positive and a negative output, and wherein the high pass filter circuit includes:
 a first capacitor coupled between the positive transmitter circuit output and the transmission line;
 a first resistor coupled parallel to the first capacitor;
 a second capacitor coupled between the negative transmitter circuit output and the transmission line; and
 a second resistor coupled parallel to the second capacitor.

\* \* \* \* \*